United States Patent [19]

McKenzie

[11] Patent Number: 4,621,856
[45] Date of Patent: Nov. 11, 1986

[54] MOUNTABLE AND DEMOUNTABLE PARTITION STRUCTURE FOR MOTOR VEHICLES

[75] Inventor: William P. McKenzie, Ontario, Canada

[73] Assignee: W/S Group Inc., Markham, Canada

[21] Appl. No.: 754,153

[22] Filed: Jul. 12, 1985

[51] Int. Cl.$^4$ .............................................. B60R 27/00
[52] U.S. Cl. .................... 296/24 R; 280/749
[58] Field of Search .................... 296/24 R, 24 B; 280/749; 410/127

[56] References Cited

U.S. PATENT DOCUMENTS

| | | | |
|---|---|---|---|
| 2,826,788 | 3/1958 | Graham | 280/749 |
| 2,827,305 | 3/1958 | Graham | 280/749 |
| 3,632,154 | 1/1972 | Woodrich | 296/24 R |
| 3,643,972 | 2/1972 | Caiati | 280/749 |
| 4,015,875 | 4/1977 | Setina | 296/24 R |
| 4,035,014 | 7/1977 | Sellers | 296/24 R |
| 4,095,837 | 6/1978 | Hunter | 296/24 R |
| 4,411,465 | 10/1983 | Stuart, Jr. | 296/24 R |

Primary Examiner—Robert R. Song
Attorney, Agent, or Firm—Donald E. Hewson

[57] ABSTRACT

A mountable and demountable partition structure for motor vehicles, such as vans and station wagons, is provided. The partition comprises a panel which is adapted to extend substantially from top to bottom and from side to side of the vehicle, where it is mounted; and is mounted by fastener means extending downwardly through brackets at the bottom edge of the panel into plates secured in the floor of the vehicle, and through brackets at the top of the panel into tracks mounted between roof ribs in the roof of the vehicle. The panel comprises three panel portions, each of which extends across the width of the panel, where the upper panel portion is tilted fowardly from the vertical, and the lower portion is tilted rearwardly from the vertical, when mounted. The overall configuration of the panel is that of a forwardly bowed panel; and at least the upper and middle panel portions of the panel are made of a solid, translucent material such as sheet polycarbonate, thereby providing a clear, glare-free and unobstructed rearwards view for the driver of the vehicle. Because of its bowed configuration, the partition provides additional safety to the occupants of the vehicle in the event that a forwardly moving object strikes the partition, as in the event of a collision when passengers or cargo are not secured in the rear of the vehicle. The partition provides for energy efficiency by permitting greater loading of the cargo compartment of the vehicle, as well as maintaining heating or air conditioning effects to the passenger compartment of the vehicle.

10 Claims, 5 Drawing Figures

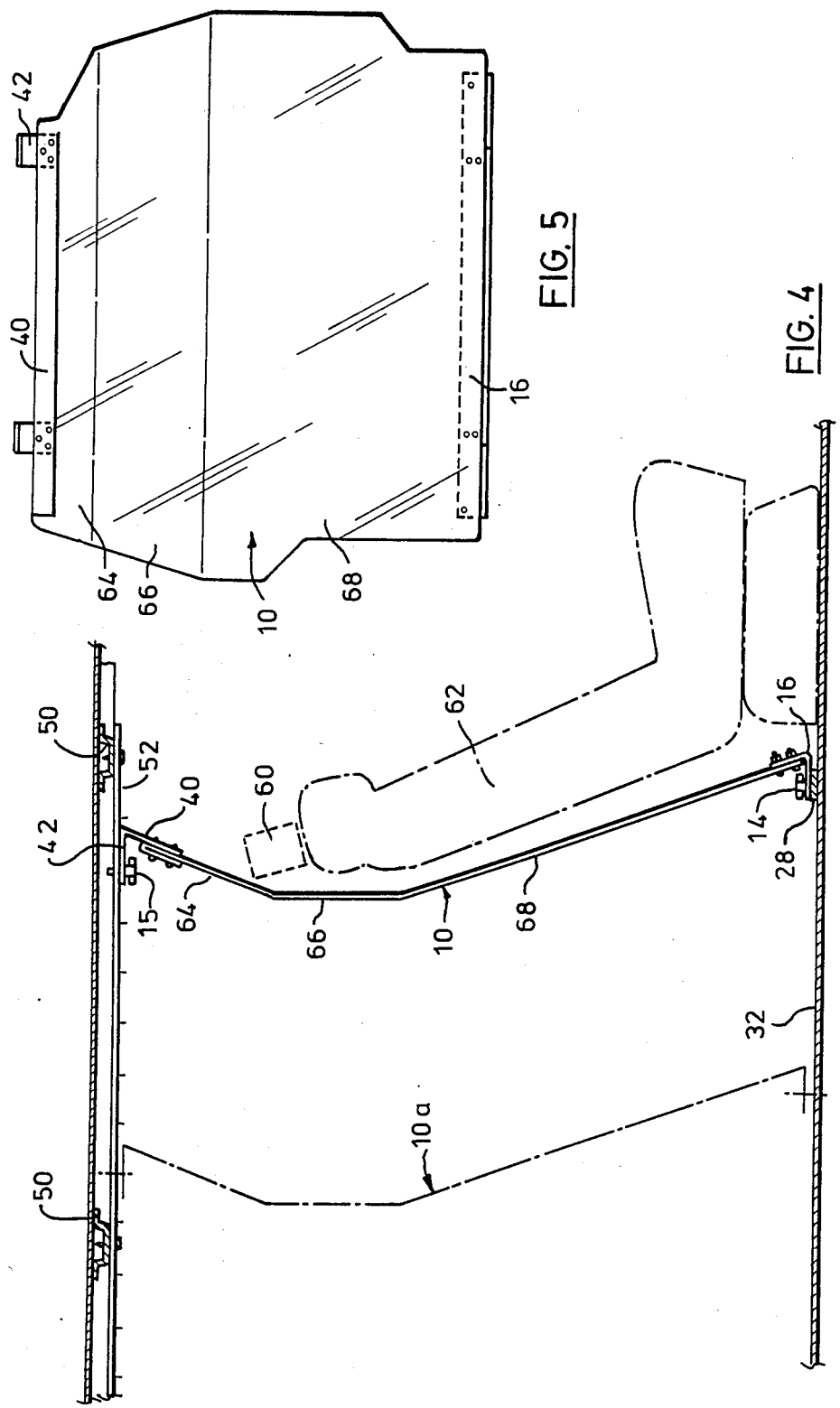

MOUNTABLE AND DEMOUNTABLE PARTITION STRUCTURE FOR MOTOR VEHICLES

FIELD OF THE INVENTION

This invention relates to partitions for vans and other vehicles such as station wagons and the like, and particularly relates to a mountable and demountable partition having increased safety and energy conservation purposes and advantages. The partition of the present invention permits the driver of the vehicle to have a clear, unobstructed and glare-free rearward view from his position in control of the vehicle.

BACKGROUND OF THE INVENTION AND PRIOR ART

Many vehicles are known to have partitions placed in them, for a variety of reasons. For instance, it is common for partitions to be placed behind the driver's seat in a van or mini-van, or other unitary body vehicle which is used particularly for delivery of parcels or for transporting tools and service parts, and the like. Thus, partitions in commercial vehicles are well known.

However, most partitions in commercial vehicles are of the type that are made of expanded metal or punched metal sheets. Such partitions are heavy, adding increased weight to the vehicle, they are difficult to install, and they provide obstructions if not totally obscure the rearward view of the driver of the vehicle. Moreover, such partitions tend, in many cases, not to serve the particular purpose for which they were originally installed, and that is to provide a safety barrier in the event of a panic stop or collision of the vehicle, where cargo—or other passengers—behind the partition are not fully secured and may be urged forwardly. Sometimes, as with a tool box, or certain types of cargo, such uncontrolled forward movement of such objects in an accident situation may cause more damage to the vehicle and the occupants of the vehicle than the accident itself.

Moreover, it has been noted that especially when vehicle partitions are placed in commercial vans, and the partitions are formed of expanded metal, the driver of the vehicle—if not the policy of the owner of the vehicle—may not permit loading of packages, tools, spare parts, and the like, to the extent that the full interior cargo compartment of the vehicle is utilized.

Other partitions have been known, such as safety partitions in police and taxi vehicles, where the front and rear passenger seats are segregated one from the other. Usually, those kinds of structure mount over the rear of the front seat of the vehicle, and are often mounted to the seat structure; thereby restricting the fore and aft movement of the front seat to accommodate drivers of different sizes, without particularly enhancing the safety of the driver except from that of a person in the rear seat of the vehicle attempting to climb into the front seat of the vehicle over the back of the front seat.

Some structures have been known that are particularly provided for separating the space in the front of a vehicle such as an automobile or van, for purposes of improving heating or cooling efficiency of the vehicle, but without any particular attention or attempt to provide safety for the persons in front of the barrier. For example, U.S. Pat. No. 3,632,154, issued to Woodrich on Jan. 4, 1972, provides a partition which is generally flexible and transparent, extending from floor to ceiling behind the operator's feet, and secured in position by such means as a VELCRO (trade mark) strip. Obviously, such partition has no physical integrity as to its ability to withstand impact of any object having any significant mass as the object moves forward in the vehicle in an accident situation.

Another such structure is shown in Hunter, U.S. Pat. No. 4,095,837 issued June 20, 1978. That patent shows a transparent flexible curtain which has two overlapping halves that are slidably fixed to a track mounted in the vehicle, where the curtain is made of semi-flexible material such as polyethylene and touches the back rest of the vehicle seat.

Two United States patents issued on Mar. 18, 1958 to Graham, U.S. Pat. Nos. 2,826,788 and 2,827,305, each teach curved barriers having very complicated structures. Their principal purpose is to absorb impact in a variety or situations, including when in an automobile to reduce the likelihood of rebound of an object backwards from the partition.

Another safety shield or partition, particularly to preclude whiplash, is provided by Caiati et al in U.S. Pat. No. 3,643,972, issued Feb. 22, 1972, where a yieldable and flexible transparent material is mounted over passenger seats in automobiles. On the other hand, Setina in U.S. Pat. No. 4,015,875, issued Apr. 5, 1977, provides a curved partition having a curved vertical sliding partition window, which is particularly intended for use in police and taxi vehicles, and which is installed so as not to intrude into the rear passenger compartment and thereby so as to reduce leg room, by being mounted to a roll bar.

In contradistinction to all of the above, the present invention provides a partition which can be used in vans, mini-vans, and station wagons, which can be mounted and demounted quickly and easily, and which provides substantially unbreakable and shatterproof protection against impact of a forwardly moving object. Moreover, because of the configuration of the partition according to the present invention, not only does the driver of the vehicle have a clear and unobstructed view rearwards, he is also assured of relief from glare in the event of strong headlights from an oncoming vehicle.

Additionally, the partition according to the present invention provides heating and cooling efficiency, particularly in vans and other commercial vehicles where only a small portion of the vehicle must be heated or cooled for the comfort of the driver and any passenger that he may have, without the necessity of heating or cooling the entire interior of the vehicle. Energy savings are thereby achieved.

Moreover, because the cargo compartment of the vehicle can be more completely loaded, as discussed hereafter, additional energy savings may be realized due to more efficient vehicle use.

One of the particular advantages of the present partition is that it not only may be mounted and demounted from the vehicle very quickly and easily, its position within the vehicle may be changed; and in most cases that action involves only the fastening or unfastening of four hand-driveable fastening means such as carriage bolts having wings or other thumb screw operating means affixed thereto.

The mounting and demounting of the partition structure according to the present invention is particularly achieved by providing bracket means secured to the bottom of the partition panel with fastener means extending downwardly through the bracket means into co-operating means in the floor of the vehicle, and by other fastener means extending upwardly through bracket means at the top of the partition panel into co-operating means in the roof of the vehicle.

More particularly, the co-operating means in the floor of the vehicle comprises at least one pair of sideways spaced plates that are mounted in the floor; most often, two or three pairs of plates are provided especially in the case of a mini-van or other vehicle where two passenger seats accommodating four or six passenger may sometimes be used, and in other cases where only the front passenger seat is used, and when in each instance cargo such as tools and the like may be carried in the rear of the vehicle.

The top edge of the panel is secured in place most efficiently, and its positioning may be varied slightly to accommodate certain circumstances such as movement from one vehicle to another where the vehicles have been made by different manufacturers, by providing a pair of spaced tracks secured in the roof of the vehicle, and having a plurality of openings spaced lengthwise along each track to receive the fasteners.

It has been determined that, for the most part, three standard sizes of partitions can be provided to fit into most station wagons, most mini-vans and most full size vans, regardless of whom they were manufactured by. That is to say, a fleet owner having a number of, say, vans may move the partitions of the present invention within the vans from one or another more forward or more rearward location—or he may install more than one partition in the vehicle—or he may move partitions from one vehicle to another such as when the vehicles are taken out of service, without having to pay particular regard to whether or not the second vehicle into which a partition is being installed was manufactured by the same company as manufactured the vehicle from which the partition was taken. Of course, the fleet owner would permanently install plates in the floors of all of his vehicles, and tracks in the roofs of all of his vehicles, as their installation must be secure and their cost is low compared with the cost of the partition panel itself.

As to the panel, especially in such vehicles as station wagons and mini-vans, where very often the vehicle is used for passenger purposes, the entire panel may be manufactured of a preferred material such as sheet polycarbonate—particularly, for example that which is sold in association with the trade mark LEXAN. On the other hand, where partitions are installed in full size vans which are particularly used for commercial purposes only, such as transporting parcels or for transporting tools and service parts—for such fleet operators as government, utility companies and computer and photocopier manufacturers—and especially where such vehicles are full sized vans, it may be advantageous from a cost point of view to provide a partition panel in keeping with the present invention where the lower portion of the panel is manufactured from steel or other lower cost high strength material.

The impact strength of partition panels according to the present invention comes from two different factors in particular: the first comes from the fact that at least the upper portion—if not the entire panel—is manufactured from polycarbonate, having high impact (and even bulletproof) strength; and the second comes from the generally bowed or arched configuration of the partition panel.

BRIEF DESCRIPTION OF THE DRAWINGS

All of the above features and advantages of the present invention are more fully described hereafter, in association with the accompanying drawings, in which:

FIG. 4 is a side elevation of a partition mounted in a vehicle, with an alternate or additional partition also being shown; and FIG. 5 is an elevation of a typical partition according to the present invention, when viewed from the rear thereof.

DESCRIPTION OF THE PREFERRED EMBODIMENTS

Figure 1:
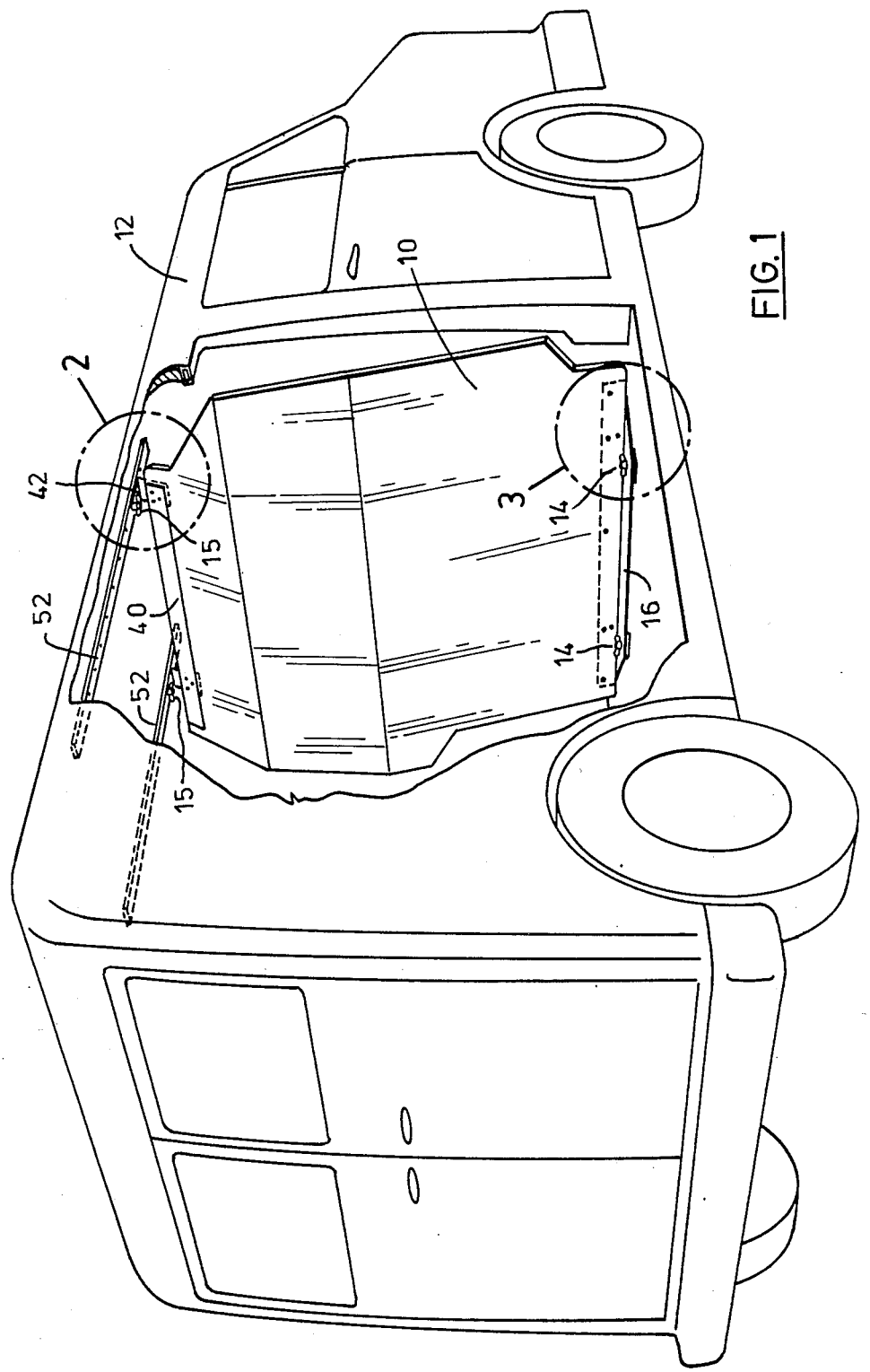
FIG. 1 is a perspective view of a typical partition according to the present invention installed in a typical commercial vehicle such as a van.
Figure 2:
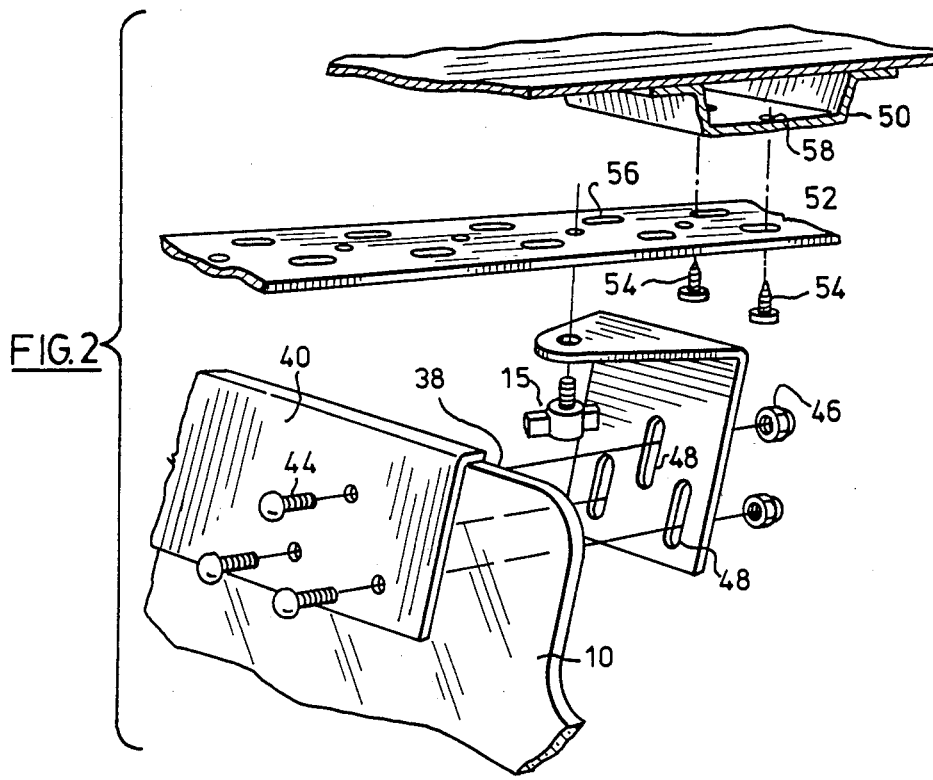
FIG. 2 is an exploded detailed assembly of area "2" in FIG. 1, showing assembly of the top of the partition within a vehicle.
Figure 3:
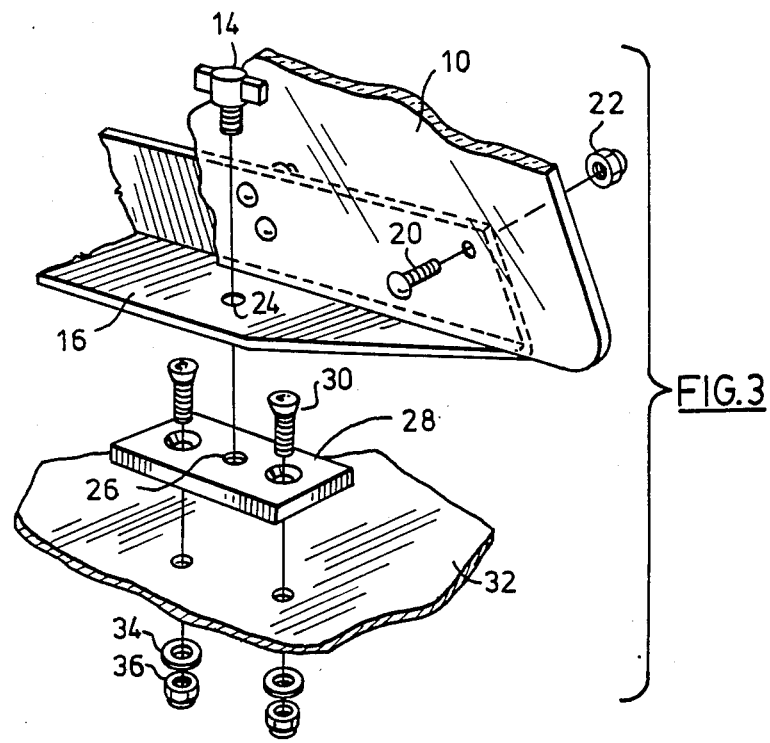
FIG. 3 is an exploded detailed assembly of area "3" in FIG. 1, showing assembly of the bottom of the partition within a vehicle.

In FIG. 1 there is shown a typical partition 10 mounted in a van 12, the side of which has been removed for purposes of clarity. As will be seen hereafter, the partition structure which is illustrated in FIG. 1—and in the other figures—is one of a mountable and demountable panel; and as will also be noted particularly in FIGS. 1, 4 and 5, the partition of the present invention is one which is adapted to extend substantially from the top to the bottom and from side to side of the vehicle in which it is mounted.

It will be noted also, particularly from FIGS. 1 and 4, that it is the intention that the partition of the present invention be mounted in relatively close proximity to the back of the passenger seat or the driver's seat in the vehicle, or any of them. That is to say, the positioning of the partition in a vehicle may be chosen at will, and may be such that the partition fits relatively closely to the back of the vehicle seat behind which it is mounted, or it may be spaced further away to accommodate rearward tilt of the vehicle seat, if desired, and yet still provide the other features and advantages of the present invention including protection of any person seated in front of the partition from the impact of any object flying forward in the vehicle in an uncontrolled manner in the event of an accident. The partition panel 10 is mounted in the vehicle by at least two fastener means 14 which extend downwardly through bracket means that are secured to the bottom of the panel 10, and by at least two additional fastener means 15 which extend upwardly through bracket means secured to the top of the panel 10.

Preferably, and as discussed previously, the mounting of the bottom of the panel 10 into a vehicle is by means of the fastening means 14 which pass through a bracket 16 mounted at the bottom edge 18 of the panel 10. The bracket 16 is an angled bracket, and in the usual embodiment is dimensioned so as to extend across substantially the width of the bottom edge 18 of the panel 10. The bracket 16 may be secured to the panel 10 by such means as bolts 20 passing through suitable holes formed in the bracket 16 and the panel 10, and secured by acorn nuts 22. Each fastener 14 may be such as a carriage bolt having a wing nut or thumb screw secured to it.

The bolt 14 is adapted to pass through hole 24 in the bracket 16, and into a tapped hole 26 which may be formed in each of at least one pair of sideways spaced plates 28 that are mounted in the floor of the vehicle. The plates 28 may be mounted, for example, by bolts 30 passing through holes in the floor 32 of the vehicle and secured by lock washers 34 and acorn nuts 36. Obviously, the plates 28 are mounted in a permanent manner into the floor of the vehicle.

The mounting of the partition, at its top edge, may be particularly accommodated by bolts 15 which are structurally identical to bolts 14 discussed above. However, in this case, at the top edge 38 of the panel 10, there is a plate 40 which is dimensioned so as to extend substantially across the width of the top edge of the panel 10, and which is secured to a securing bracket 42 such as by bolts 44 passing through holes formed in the plate, the panel, and the securing bracket, and secured by acorn nuts 46. More usually, the bolts 44 pass through vertically oriented slots 48 that are formed in the securing bracket 42, so as to accommodate variations of the physical height of the vehicle into which the partition may be installed.

In the roof of the vehicle, as manufactured, there are a plurality of stiffening ribs 50. A pair of spaced tracks 52 is mounted in a fore-to-aft orientation in the roof of the vehicle, and each track 52 is secured to at least one spaced pair of stiffening ribs 50, as indicated in FIG. 4. The mounting of the tracks 52 to the stiffening ribs 50 is accomplished by passing self-tapping screws 54 up through slots 56 that are formed in the tracks 52, and into pilot holes 58 that are drilled into the stiffening ribs 50. The slots 56 accommodate various spacings of the stiffening ribs 50.

As seen in FIG. 4, the partition 10 may also have an alternate position indicated by the chain line at 10a; or, 10a may indicate the mounting of an additional partition 10 within the vehicle. Also, as seen in FIG. 4, an additional mountable and demountable head rest 60 may be propped against or, indeed, may be secured to the front face of the partition 10, to provide additional anti-whiplash protection for the person seated in the vehicle seat indicated generally at 62.

It will be noted that each partition 10 comprises three portions; an upper portion 64, a middle portion 66, and a lower portion 68. It will also be noted, especially with reference to FIG. 4, that the angle that is subtended by the upper portion 64 and the middle portion 66 is less than 180 degrees; and also that the angle that is subtended by the middle portion 66 and the lower portion 68 is less than 180 degrees.

Moreover, it will be noted that the upper portion 64 of the panel 10 is tilted forwardly from the vertical (in a bottom to top sense); and that the lower portion 68 is tilted rearwardly from the vertical (in a bottom to top sense). Depending on the exact configuration and mounting of the partition within the vehicle, the middle portion 66 may be vertical, or it may be slightly tilted rearwardly or forwardly.

Thus, depending on the type of vehicle into which the partition is intended to be installed—i.e., station wagon, mini-van or full size van—the manufacturer of the partition may adjust the angle subtended between the top portion 64 and the middle portion 66 to be between about 155° and 175°; and likewise, the angle between the middle portion 66 and the lower portion 68 may be adjusted to be between about 135° and 175°. What is particularly interesting and of note is the fact that the configuration of a panel such as that which is shown in FIG. 5, for example, may be accommodated in many vans that are manufactured by any of the big three North American automotive manufacturers; and the only changes are the exact positioning of the securing brackets 42, as they may be mounted slightly higher or lower and as accommodated by the slots 48 formed therein.

The fact of the forward tilted upper portion 64 of panel 10 provides a non-glare environment for the driver of the vehicle, particularly in the event that an oncoming vehicle has very strong headlights. This permits the driver of the vehicle, therefore, to not only have a clear, glare-free and unobstructed view of what is behind him, he may at any time make a quick check on the contents of the cargo compartment of the vehicle immediately behind him.

It has been noted that at least the upper portion 64 and the middle portion 66 of the panel 10 of the partition according to the present invention are formed of a solid translucent material such as LEXAN. The lower portion 68 may be formed of sheet steel secured to the upper portion, but it may also be that the entire panel is formed of sheet polycarbonate for purposes of appearance and aesthetics.

It will be evident, particularly from FIGS. 1 and 4, that the partition of the present invention provides a very real safety barrier for the benefit of the driver and or passengers who are seated in front of it, in the event that any object comes flying forward against the partition in a panic stop or collision situation. The generally bowed arched configuration provides substantial impact strength; and when the panel is formed of polycarbonate which is substantially unbreakable and shatterproof, even greater protection is afforded. Moreover, because at least the upper portions 64 and 66 of the panel 10 are formed of clear and translucent material, a clear and unobstructed view of what is behind the partition is afforded at all times. Still further, the anti-glare portion 64 protects the driver from strong oncoming headlights and the like.

It will also be evident that relatively good energy efficiency is provided by the partition of the present invention, because of the configuration of the panel, as it may be designed and installed in any vehicle. Thus, the heating or cooling effort expended by the engine of the vehicle in maintaining the comfort of the driver and any passenger in the forward portion of the vehicle is not wasted on cargo and/or empty space behind the partition.

Still further, additional energy efficiency is realized because a driver, especially one of a commercial vehicle or a fleet service vehicle, may be much more willing to load his vehicle to a greater extent than if he is provided with, say, an expanded metal partition. This is because the driver is much more secure and aware of the protection that is afforded to him by the impact absorbing and shatterproof structure of the partition panel of the present invention.

A still further energy advantage is provided for the owner/operator of the vehicle, and that is that the weight of the partition according to the present invention is considerably less than that even of an expanded metal partition, so that there is no significant additional weight to be transported.

The advantages and features of the partition according to the present invention are discussed for purposes of explanation and clarification, and are not intended as being inclusive of all advantages and features that may be afforded by restrictive barriers or partitions according to the present invention. The exact configuration of any partition is according to the interior dimensions of vehicles or classes of vehicles into which the partition may be installed, and is without reference to any specific vehicle.

The structure of the present invention in respect of which patent coverage is sought, is defined by the appended claims.

I claim:

1. A mountable and demountable partition structure for motor vehicles having a panel adapted to extend substantially from top to bottom and from side to side of the vehicle in which it is mounted;

where said panel is mounted to said vehicle by at least two fastener means extending downwardly through bracket means secured to the bottom of the said panel into co-operating means in the floor of the vehicle, and by at least two fastener means extending upwardly through bracket means secured to the top of said panel into co-operating means in the roof of the vehicle;

where said co-operating means in the floor of the vehicle comprises at least one pair of sideways spaced plates mounted in the floor of the vehicle for co-operating with said fastener means;

and where said panel comprises three panel portions each extending across the width of said panel;

the upper panel portion being tilted forwardly from the vertical when said partition is in its mounted condition;

the middle and upper portions subtending an angle between them of less than 180°;

the middle and lower portion subtending an angle between them of less than 180°;

the lower panel portion being tilted rearwardly from the vertical when said partition is in its mounted condition;

at least the upper and middle panel portions of said panel being made of a solid, translucent material.

2. The partition structure of claim 1, where said cooperating means in the roof of the vehicle comprises a pair of spaced tracks each mounted in fore-to-aft orientation in the roof of the vehicle, and each having a plurality of openings spaced lengthwise along each track for co-operating with said fastener means.

3. The partition structure of claim 1, where said bracket means at the bottom of said panel comprises an angled bracket mounted at the bottom edge of said panel and extending across substantially the width of said bottom edge.

4. The partition structure of claim 3, where said bracket means at the top of said panel comprises a plate mounted at the top edge of said panel and extending across substantially the width of said top edge, and a pair of angled roof securing brackets mounted with said plate at spaced positions across said top edge.

5. The partition structure of claim 1, where the material of at least said upper and middle panel portions of said panel is sheet polycarbonate.

6. The partition structure of claim 1, where the material of at least a portion of the lower panel portion of said panel is metal.

7. The partition structure of claim 1, where the material of said panel is sheet polycarbonate.

8. The partition structure of claim 1, where each of said at least one pair of sideways spaced plates is secured to the floor of the vehicle, and is tapped to receive threaded fastening means extending downwardly through said bracket means secured to the bottom of said panel.

9. The partition structure of claim 2, where each of said pair of spaced tracks is mounted by being secured to at least two spaced ribs in the roof of the vehicle, and each of said plurality of openings is tapped to receive threaded fastening means extending upwardly through said bracket means secured to the top of said panel.

10. The partition structure of claim 1, where the subtended angle between said upper and middle panel portions is in the range of 155° to 175°, and where the subtended angle between said middle and lower panel portions is in the range of 135° to 175°.

* * * * *